(12) United States Patent
Jones, III et al.

(10) Patent No.: US 6,925,441 B1
(45) Date of Patent: Aug. 2, 2005

(54) SYSTEM AND METHOD OF TARGETED MARKETING

(75) Inventors: Charles L. Jones, III, Marblehead, MA (US); William A. Eginton, Philomont, VA (US)

(73) Assignee: Marketswitch Corp., Dulles, VA (US)

( * ) Notice: Subject to any disclaimer, the term of this patent is extended or adjusted under 35 U.S.C. 154(b) by 0 days.

(21) Appl. No.: 08/958,675

(22) Filed: Oct. 27, 1997

(51) Int. Cl.⁷ .............................................. G06F 17/60
(52) U.S. Cl. .......................................... 705/10; 705/14
(58) Field of Search ................................ 705/14, 26, 1, 705/10

(56) References Cited

U.S. PATENT DOCUMENTS

| | | | |
|---|---|---|---|
| 4,872,113 A | | 10/1989 | Dinerstein et al. .......... 364/401 |
| 5,056,019 A | | 10/1991 | Schultz et al. ............... 364/405 |
| 5,283,731 A | * | 2/1994 | Lalonde et al. ............... 705/14 |
| 5,353,218 A | | 10/1994 | DeLapa et al. .............. 364/401 |
| 5,459,306 A | | 10/1995 | Stein et al. .................. 235/383 |
| 5,583,763 A | | 12/1996 | Atcheson et al. ...... 364/551.01 |
| 5,592,560 A | | 1/1997 | Deaton et al. .............. 382/100 |
| 5,621,812 A | | 4/1997 | Deaton et al. .............. 382/100 |
| 5,627,973 A | * | 5/1997 | Armstrong et al. ......... 395/210 |
| 5,630,127 A | * | 5/1997 | Moore et al. ................ 395/615 |
| 5,649,114 A | * | 7/1997 | Deaton et al. ................. 705/14 |
| 5,724,521 A | * | 3/1998 | Dedrick ....................... 705/14 |
| 5,740,549 A | * | 4/1998 | Reilly et al. ................... 705/14 |
| 5,774,868 A | * | 6/1998 | Cragun et al. ................ 705/14 |
| 5,774,870 A | * | 6/1998 | Storey ......................... 705/14 |
| 5,857,175 A | * | 1/1999 | Day et al. ..................... 705/14 |
| 5,864,822 A | * | 1/1999 | Baker, III ..................... 705/14 |
| 5,873,068 A | * | 2/1999 | Beaumont et al. ............ 705/14 |
| 5,953,707 A | * | 9/1999 | Huang et al. ................. 705/10 |
| 5,974,396 A | * | 10/1999 | Anderson et al. ............. 705/10 |
| 6,085,169 A | * | 7/2000 | Walker et al. ................ 705/26 |

FOREIGN PATENT DOCUMENTS

| | | | |
|---|---|---|---|
| WO | Wo9103789 | * | 3/1991 |
| WO | Wo9723838 | * | 7/1997 |

OTHER PUBLICATIONS

Hartfeil " Bank One measures profitability of customers, not just products. (Bank One Corp.)"; Aug. 1996; Journal of Retail Banking Services, v18, n2, p23(7); Dialog file 148, Accession No. 88487739.*

Culhane Data: powerfully linking service and profitability. (enhancing banks' customer service through data–driven procedures and programs); Aug. 1996, Bank Management, v72, n4, p(8); Dialo/g file 148, Accession No. 09341521.*

Wyner "Customer valuation: Linking behavior and economics"; Aug. 1996; Marketing Research: A Magazine of Management & Applications v8n2 PP: 36–38; Dialog file 15, Accession No. 01273976.*

Database Marketing: A new Aproach to the old Relationships; Chain Store age executive Edition; Dialogue, File: 16, Accession No. 03354618, Sep. 1991.*

Rossi et al.; "The Value of Purchasing History Data in Target Margeting"; University of Chicago, Apr. 1996.*

* cited by examiner

*Primary Examiner*—Romain Jeanty
(74) *Attorney, Agent, or Firm*—Piper Rudnick LLP; Jerold I. Schneider

(57) ABSTRACT

A system and method of targeted marketing to consumers, including businesses and associates, based upon the financial characteristics of the consumer, type offer being made and the channel of communication for delivery of the offer. The consumer is characterized based upon financial, behavioral, and socioeconomic factors. The offer is characterized based upon the consumer and the potential for the consumer accepting the offer. The channel of communication for delivery of the offer is also characterized and combined with the consumer and consumer-offer characteristics to arrive at a net present value of the offer to be made. If the net present value is sufficient the offer is processed and presented to the consumer. If the net present value is not sufficient, the offer is revised to present a better value to the consumer (or discarded if the required offer value can not be created) thereby enhancing the chances that the consumer will accept the offer in question. In this way the system and method of the target marketing creates value in both releasing, and not releasing, specific offers.

19 Claims, 11 Drawing Sheets

SYSTEM AND METHOD OF TARGETED MARKETING

FIELD OF THE INVENTION

This invention relates generally to marketing of goods and services to consumers. More particularly this invention provides a system and method for targeted marketing to specific consumers based upon the profile of the consumers, the channel of communicating the offer and the goods to be offered.

BACKGROUND OF THE INVENTION

Who among us has not received unwanted "junk mail" for goods and services in which we have absolutely no interest. The average amount of junk mail received by consumers is 40 pounds per year. Aside from being environmentally unsound given the heavy metals in printing ink, it is a constant annoyance which many consumers would like to avoid. Junk mail marketing and telemarketing are also increasingly inefficient ways to reach consumers and to induce them to spend money on products or services. Currently, the return rate on such blind offers is about 1%. If the right consumers could be contacted with the right offers, the return rate for such mailing would dramatically increase and the amount of junk mail being indiscriminately sent to consumers would dramatically decrease. Thus both economic and environmental benefits would be achieved.

Superimposed on the wants and need of the consumer are the needs of the merchants that offer goods and services to the consumer. A merchant selling luxury cars has no desire to have as a client a consumer who lacks the ability to pay for the luxury car. If the car is to be financed, the car dealer loses if the consumer is rejected for a bank loan due to poor credit history. Thus it is important to the purveyor of goods and services that the right offer goes to the right consumer in order to maximize the return on such mailings.

Targeted marketing has been the subject of invention. For example, U.S. Pat. No. 5,592,560, issued to Deaton et al. discloses a system and method for performing targeted marketing of retail customers. The invention is principally a point-of-sale system that relies on a database that matches a customer with a record of past purchases. The customer matching can be in the form of the MICR coding on a check, or some other form of customer identification number (a check cashing card number for example). The customer database contains purchase amounts and dates, and there is an implication that it could include brand name, volume and cost information. The invention specifically claims a system and method to target the customer with incentives to return to the point-of-sale location and purchase items that they have infrequently purchased in the past.

Though the concept of developing a customer database and targeting the customer based on purchases is present, this invention represents a single point-of-sale system and method that is not apparently networked with multiple points-of-sale beyond the individual store or store chain. Further there are no rewards for customer loyalty, no specific incentive system, delivered at the point-of-sale, or mailed; and there is no apparent learning cycle or substantial database analysis to pro-actively identify trends of individual consumers and target them with specific content package rewards to reinforce loyalty. Additionally this invention is controlled by the point-of-sale retailer and not by a neutral party that can evaluate the totality of a consumer's spending habits.

U.S. Pat. No. 5,621,812 issued to Deaton et al. discloses a system and method for performing targeted marketing of retail customers. The disclosure of this '812 patent is substantially the same as the disclosure in '560. The incentives of '812 are "directed toward only the class of customers who meet said predetermined shopping history criteria, . . . contingent upon a customer meeting a predetermined future shopping criteria."

Again this invention deals with a single point-of-sale system and method that is not networked with multiple points-of-sale beyond the individual store or store chain. Further the database of '812 tracks customer transactions limited to dollars spent and date of transaction.

U.S. Pat. No. 5,583,763 issued to Atcheson et al. discloses a system and method for determining possible undisclosed preferences of a customer. For example, the invention assumes that if two people have similar tastes in music, it is likely that the music preferences of one will be desired by the other. The invention discloses a system to match and weight a first customer's disclosed preferences with preferences of other customers to identify undisclosed preferences of the first customer. This invention does not disclose any form of tailored reward or incentive based on customer loyalty, is controlled by the point-of-sale retailer and is oriented to the music and entertainment industry.

U.S. Pat. No. 5,459,306 issued to Stein et al. discloses a system and method for providing coupons that are targeted to individual customers with the coupons containing promotional material and recommendations. The invention discloses maintaining a consumption history related to a customer, and explicitly targets particular customers. An objective is to predict the likely purchase for the consumer. The customer database that is disclosed includes birthday, address, children and past products consumed. The promotional material could include discount coupons and announcements. The network disclosed is limited to a single industry and most importantly, the reward system is controlled by the point-of-sale retailer.

U.S. Pat. No. 5,353,218 issued to De Lapa et al. discloses a system and method for generating and redeeming discount coupons for a selected consumer. The invention further discloses selecting future coupons for the selected consumer based on the coupons previously redeemed by the consumer. The invention discloses a form of micro marketing tailored messages to a particular consumer based upon unique characteristics of that consumer. Shopping habits are one of those unique characteristics. The invention discloses matching consumer purchases with consumer identification information like income and demographics. The invention also discloses the consumer identification information being voluntarily provided.

Though an object of the invention is to induce the consumer to shop at the retailer participating in the system and increase the total purchases from that retailer, the invention also discloses providing higher coupon values to non-consumers than those provided to regular consumers. This process does not necessarily encourage the loyalty of existing customers. The invention further discloses a system that is organized and controlled by a particular retail establishment and is intended to increase the pool of customers who regularly use that particular store. There is no disclosure of cooperative marketing across product boundaries.

U.S. Pat. No. 5,056,019 issued to Schultz et al. discloses a system and method for providing manufacturer purchase rewards through automatic tracking of consumer purchases.

This allows the manufacturer to track fulfillment and redemption of those purchasing incentives. An object of the invention is to automatically credit a consumer's purchase toward a purchase reward without use of the mail. Another object of the invention is reward of specific purchase behavior and increasing customer brand loyalty. There is no disclosure of a method to actively target consumers beyond redemption of their rewards. Further the invention relates to automated scanning of bar codes.

U.S. Pat. No. 4,872,113 issued to Dinerstein discloses a system and method for correlating product purchases and individual consumer data. The invention tracks purchases through automated scanning, like the UPC code, and identifies individual consumers through unique codes. Product information is related to individual consumer data to provide marketing reports to manufacturers, thereby improving market knowledge of the manufacturer and reducing cost to the retailer through gathering and relating the information. No disclosure of an incentive or reward system that will increase individual consumer loyalty through reward of their individual activities. Further, the invention is heavily dependant on the process of check cashing to correlate consumer information with product information.

In summary these references are predominantly point-of-sale methods that are heavily dependant on bar code scanning and many require check payment. They are controlled by the point-of-sale retailers rather than a neutral non-retailer or database provider/operator, and few provide for merchandising from numerous merchants.

What is needed to more effectively target consumers for specific marketing is a way to determine the spending profile of consumers for a variety of merchandise. Further, a system that allows consumers to receive advertisements for goods and services from a variety of merchants and service providers without regard to where prior purchases were made will more effectively suit the needs of consumers to receive the best deal on desired goods and services. Finally, in order to maximize the consumer response to offers, the best offer, geared to an individual consumer and presented over a channel of established communications with the consumer should be presented.

SUMMARY OF THE INVENTION

It is therefore an object of the present invention to improve response rates to direct mail.

It is a further object of the present invention to achieve a better description of a particular consumer's spending habits through querying of databases kept by merchants and service providers who wish to offer goods and services.

It is a further object of the present invention to create a system for assessing "scores" attributable to particular consumer that rates the likelihood of that particular consumer responding to an offer of goods and services from merchants.

It is yet another object of the present invention to obtain a better description of the behavioral spending pattern of consumers having disparate socioeconomic backgrounds.

It is a further objective of the present invention to provide a better value to consumers for the items they truly want.

It is a further objective of the present invention to cause content providers to create better offers for consumers based upon the buying profiles of consumers.

It is yet another object of the present invention to decrease the amount of undirected mass marketing that is occurring.

It is a further object of the present invention to simplify the offers that are made to consumers.

It is a further object of the present invention to determine how purchases of selected good and services co-vary with one another to allow useful targeted marketing to occur.

It is a further object of the present invention to promote cooperation among content providers.

It is a further object of the present invention to create relationships among different lines of merchandise by studying the database to come up with draft offers (Cross category insights).

It is a further object of the present invention to apply multivariate techniques to evaluate buying trends of consumers and apply those insights to the offering of merchandise.

It is a further object of the present invention to send offers only when a consumer's score reaches a certain level associated with the particular goods to be offered.

It is a further object of the present invention to assess quality and performance of the offer and provide feedback to the merchants offering the goods in question.

It is a further object of the present invention to provide rewards to ensure loyalty of a customer to specific products and services.

It is a further object of the present invention to use "rewards currency" for any purchase from any provider in a network of product and service providers.

It is a further object of the present invention to provide rewards currency denominated in dollars to allow immediate understanding of consumers of the benefits received from the present invention.

It is a further object of the present invention to accelerate velocity of buying from a consumer, across a network of product and service providers.

It is a further object of the present invention to change the use of invoices and statements from merely requests for money to a communication of offers to consumers.

It is a further object of the present invention to send messages to consumers to remind them of the association of certain good or services to certain other goods or services.

It is a further object of the present invention to analyze debt of consumers to offer reduced rates for refinancing.

It is a further object of the present invention to partition market of products based on the best product for the class and offer only the best products in a class to consumers.

It is a further object of the present invention to improve customer retention by good offers from a provider.

It is a further object of the present invention to provide syndicate/affinity groups to syndicate offers to consumers of related goods and services.

It is a further object of the present invention to limit "junk" mail received by consumers.

It is a further object of the present invention to wait for communications channels to the consumer to naturally occur rather than simply sending offers for merchandise without the consumer requesting such information.

It is a further object of the present invention to remove unsolicited selling from the consumer process.

It is a further object of the present invention to develop profiles of a consumer based on the consumers actual spending.

It is a further object of the present invention to create variable pricing of rewards currency designed to variable price products and services to induce beneficial buyer behavior, including superior transaction velocity, retention and default management thereby creating unique liquidity attributes for those markets.

It is a further object of the present invention to develop a universal credit application using most of the information in the consumer profile.

It is a further object of the present invention to provide risk based product delivery (i.e. do not reject anyone for delivery of goods and services but only deliver goods and service to a consumer based on where the consumer places in a risk pool).

Definitions

In this specification the following terms have the following meaning:

Content Provider—A merchant or service provider that has an offer of goods or services to disseminate to potential customers.

Reward Currency—the value given to consumers, in the nature of a rebate and/or a reward for beneficial behavior (e.g. favorable retention behavior), that can be used to purchase goods and services over the present invention.

Channels of communication-any method by which the consumer communicates in an outgoing fashion or where the consumer receives information in an in-coming fashion. A utility bill is a channel of communication in-coming to the consumer. The Internet could be an incoming or out going communication channel. End user directed telephone communications represent a communications channel.

Loyalty—The characteristic in consumers to remain contractually and practically engaged with individual content providers despite competitive market pressures, alternative product or service introductions, or attrition owing to lack of interest to distraction.

Loyalty Network—Those merchants and service providers offering services via the present invention.

Financial Cards—Card-like financial devices such as debit, credit, stored value cards that can be used for the purchase of and in transactions for goods and services.

DESCRIPTION OF THE INVENTION

The present invention is a method for targeting incentives to reinforce loyalty in purchasers based on their prior purchases and their economic and demographic characteristics. The method involves a neutral agent communicating between multiple participating "content providers" and individual consumers. The neutral agent removes the parochialism of traditional providers and their incentive programs, and selects superior product offers targeted to the individual consumer based on his demonstrated purchase behavior of all observed products and services, and the consumer's economic and demographic characteristics. This consolidated network system allows more intelligent offers and incentives to reach the right consumers faster. The method uses a form of reward currency, valid for syndicate purchases at time-dependent and market-dependent rates of exchange.

The present invention fosters consumer loyalty by rewarding a consumer with "reward currency" denominated in dollars, to enhance the recognition by the consumer of the worth of the reward. For example, for each $100.00 spent the consumer is given $5.00 in reward currency to spend as the consumer sees fit. Instead of only being allowed to spend the currency at one merchant however, the consumer, via the present invention, can spend the currency at any number of merchants who are "content providers" within the system.

It is anticipated that a credit, debit, or stored value card will be issued by a financial institution to the consumer. The consumer would then be able to use the credit card at a number of merchants who are content providers to the system. This makes purchasing easier for the consumer since a single card is used versus several cards now used by consumers to reap rewards from several different merchants.

By consolidating the purchase of goods by a consumer, not only is there an advantage to the consumer, but the consumer's use of financial cards or content providers of the loyalty based relationship for many different purchases causes a great deal more information to be gleaned concerning the consumer's spending habits. Purchasing of goods and services from content providers of a loyalty based marketing network results in more data about the consumer residing in the database of the present invention. In this fashion a more accurate profile of the spending habits of the consumer can be created. Further, the consumer will be encouraged to use financial cards of the loyalty network since there will be a reward system of currency given to the consumer based on such purchases.

Another advantage of the present invention is the concept of "inverted" targeting. In this case the present invention withholds inappropriate offers from consumers based upon the particular consumer's profile. Thus the present invention reduces the "noise" associated with any channel of communicating offers, sending only those offers in which there is a reasonable likelihood that a consumers interest will in fact be present.

The database of the present invention serves a number of functions which will be explained in more detail later. In general, the database performs the usual functions associated with credit card purchase of goods and services. In addition the database gathers information on the spending habits of any given consumer, for example, what is purchased and how frequently financial cards or the loyalty based relationship marketing network of the present invention is used to purchase what merchandise (to cite but one example which is not meant to be all-inclusive) is all recorded for later analysis.

Other information about the consumer is also gathered and stored in the database for analysis. For example, lending institutions that are content providers will have a larger database of customers. That database will be examined to store records of consumers who are card users of the present invention. However, such lending institution databases also have records that demographically sort information about consumers of certain incomes. Such information will also be retrieved by the database of the present invention to use in creating offers to consumers as explained below. Other databases from merchants and others will also be tapped as part of the present invention to create the integrated database.

Content providers, that is, organizations that provide goods and services for consumers are an integral part of the system for providing value to the consumer. Content providers offer goods and services of varying value depending upon the consumer group to whom such services might be offered. For example, a lending institution as a content provider might provide personal loans to consumers of high net worth who have good credit ratings. Such a content provider will still offer loans to others but such loans might carry higher interest rates to reflect the credit worthiness of the group of consumers without a high credit rating or high net worth. Whatever packages are offered, they will be described for and made available to the present invention for marketing to consumers.

The present invention will also develop and package offers to consumers and work interactively with content providers to develop offers to be marketed to consumers. For example, based upon multivariate analysis of buying trends of consumers, the present invention will create offer packages. For example, it may be that a person that buys a luxury car may also be a person who is more inclined to take luxury cruises or stay at four-star resorts, whereas as person who buys a sport-utility vehicle may be more interested in fishing and camping equipment. As a result of this type of analysis, the present invention will ensure, through interaction with content providers that certain items or services are presented to the appropriate consumer at the appropriate time.

Once offers, or series of offers are in the inventory of the present invention, the system will provide notices of the buying opportunities only to the appropriate consumers. In short, there will be no bulk mailing of offers to consumers. Mailing will be presented to the consumers who have the highest probability of actually wanting the goods and services in question. Further, the communication with the consumer will be via the communications channel that has the highest probability of garnering the attention of the consumer to the offer being made. For example, if the consumer purchases goods and services with the consumer's credit card, a statement will be custom-generated to accompany, or be incorporated into the consumer's monthly statement. It is important to note that the consumer will not be mailed a separate piece of "junk mail" regarding the offer in question. The consumer will only receive offers through channels of communication normally used by the consumer. In scoring the propensity of a given consumer to purchase a given product, the efficacy of the communications channel itself is weighed.

Another example of channel choice could be the Internet. If the consumer has an Internet account and has authorized the system of the present invention to send such mail relating to offers, the system could also create e-mail advising the consumer of the offer in question.

The system also comprises a rewards management module that performs the function of sorting, storing, recording success of, and compiling other statistics relating to the administration of the rewards. This involves keeping track of consumer spending and tabulating currency rewards to the individual consumer for the purchase of goods and services.

These and other objectives of the present invention will become clear from the detailed explanation that follows.

DETAILED DESCRIPTION OF THE PREFERRED EMBODIMENT

Figure 1:
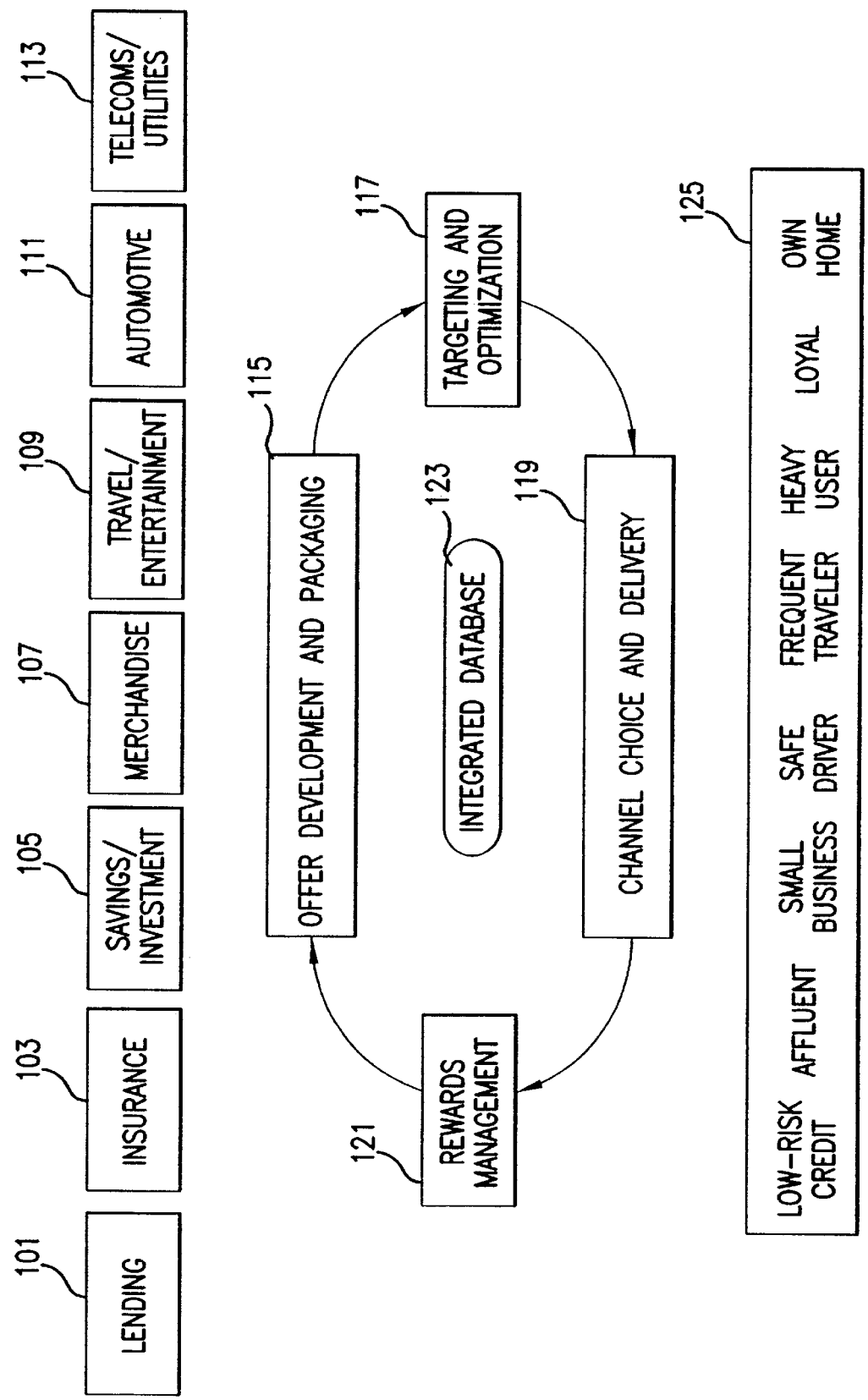
FIG. 1. Conceptual Framework of the Present Invention

Referring to FIG. 1, the overall conceptual framework of the present invention is described. The present invention is an integrated network of content providers who are essentially merchant or service providers who could offer their goods and services to consumers. Thus lending institution 101, insurance provider 103, savings and investment advisors 105, merchandise providers 107, travel/entertainment providers 109, automotive goods and services providers 111 and telecommunications/utilities 113 are but a few of the potential content providers who will make offers of their goods and services to consumers.

These various content providers and their goods and services are reviewed and packaged 115 in such a manner as to optimize the marketing of those goods and services. The offer development and packaging is a function of the present invention which will be described later.

With various goods and services available to offer to consumers the present invention targets specific consumers and optimizes the products to be offered to those consumers 117. Once the package for consumers are optimized and the particular consumers are targeted, the present invention selects the choice of communications and the method of delivering to the consumer 119.

When a consumer decides to take advantage of the particular rewards and offers made, the consumer communicates that desire to the system which then ensures that orders for goods and services are placed and records of the offers that are accepted by a wide variety of consumers are recorded. This rewards management function 121 ensures the current information on consumer spending is recorded and made part of the integrated database 123 of the overall system.

Factors such as low credit risk, affluence of a particular consumer or group of consumers, whether the consumer is a small business, whether the consumer is a safe driver or frequent traveler, whether the consumer is a heavy user of credit cards, whether the consumer repeatedly purchases from a particular merchant or service provider, and whether the consumer owns his or her own home are but a few of the factors that are reviewed in order to determine the appropriate offer to be made to the consumer. These factors 125 are used together with the integrated database 123 to create the offers sent to the consumers.

As an example of the interaction of service providers and consumers noted in FIG. 1 consider the situation where the consumer is a low credit risk and affluent consumer who is a safe driver owning a small business. This information is stored in the integrated database 123. An insurance company 103 may be able to offer very competitive rates to consumers who are safe drivers. With the knowledge in the database that the safe driver consumer recently purchased an automobile, the present invention can receive offers of low-cost insurance from the insurance provider 103 couple those together with other automotive offerings for accessories and service from an automotive provider 111, create a targeted package 117, and send that particular offer to the consumer during the normal course of invoicing on credit cards associated with that consumer. Thus the channel for choice for delivering the message 119 is one that is ordinarily reviewed by the consumer and is not a channel of communication that is forced on the consumer.

Figure 2:
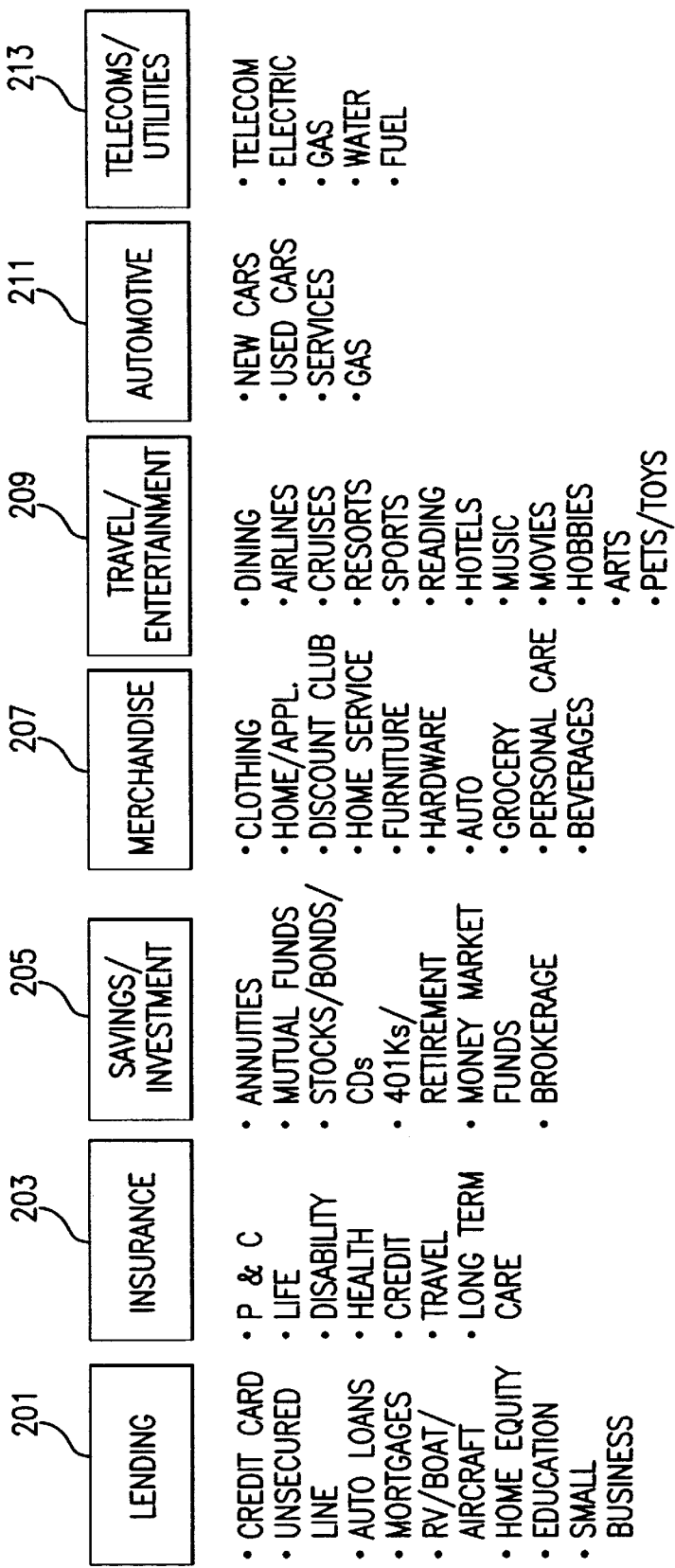
FIG. 2. Examples of Content Provider products and Services

Referring to FIG. 2, further information on the types/services to be offered by content providers is shown. For example, lending institution 201 can offer credit cards, unsecured lines of credit, automotive loans, mortgages, loans on boats and RV's, home equity loans, educational loans, small business loans, and any other type of lending that a consumer might use.

Insurance company 203 will offer a wide variety of insurance products but will only offer those products keyed to the consumer's actual need.

Savings and investment firms 205 can again offer needs based on the consumer's spending history. For example, if a consumer previously purchased mutual funds the likelihood is higher that the consumer will purchase mutual funds in the future. If the consumer is in a high income bracket, perhaps a 401K or a retirement package would be something in which the consumer would be interested.

Merchandise of all types would be offered from specific merchants 207 to the present invention. Typical offers of clothing, appliances, furniture, automobiles, personal care items, etc. would be offered based again on the consumer's ability to purchase those goods and services.

Travel and entertainment will also be one of the service or contact providers. Thus dining, airlines, cruises, resorts, hotels, and all manner of entertainment and travel will be selectively offered to consumers and managed by the system. Automotive content providers including new car sales, services, and other automotive related items can also be packaged depending upon the consumer's spending habits.

Basic needs of consumers for telecommunications (i.e. phone companies), electric utilities, gas utilities, water, and fuel delivery will also be content providers associated with the present invention. Since invoices for these services go out to consumers on a regular basis (i.e. monthly) they present a potential delivery channel to the consumer for offers of varying types.

Figure 3:
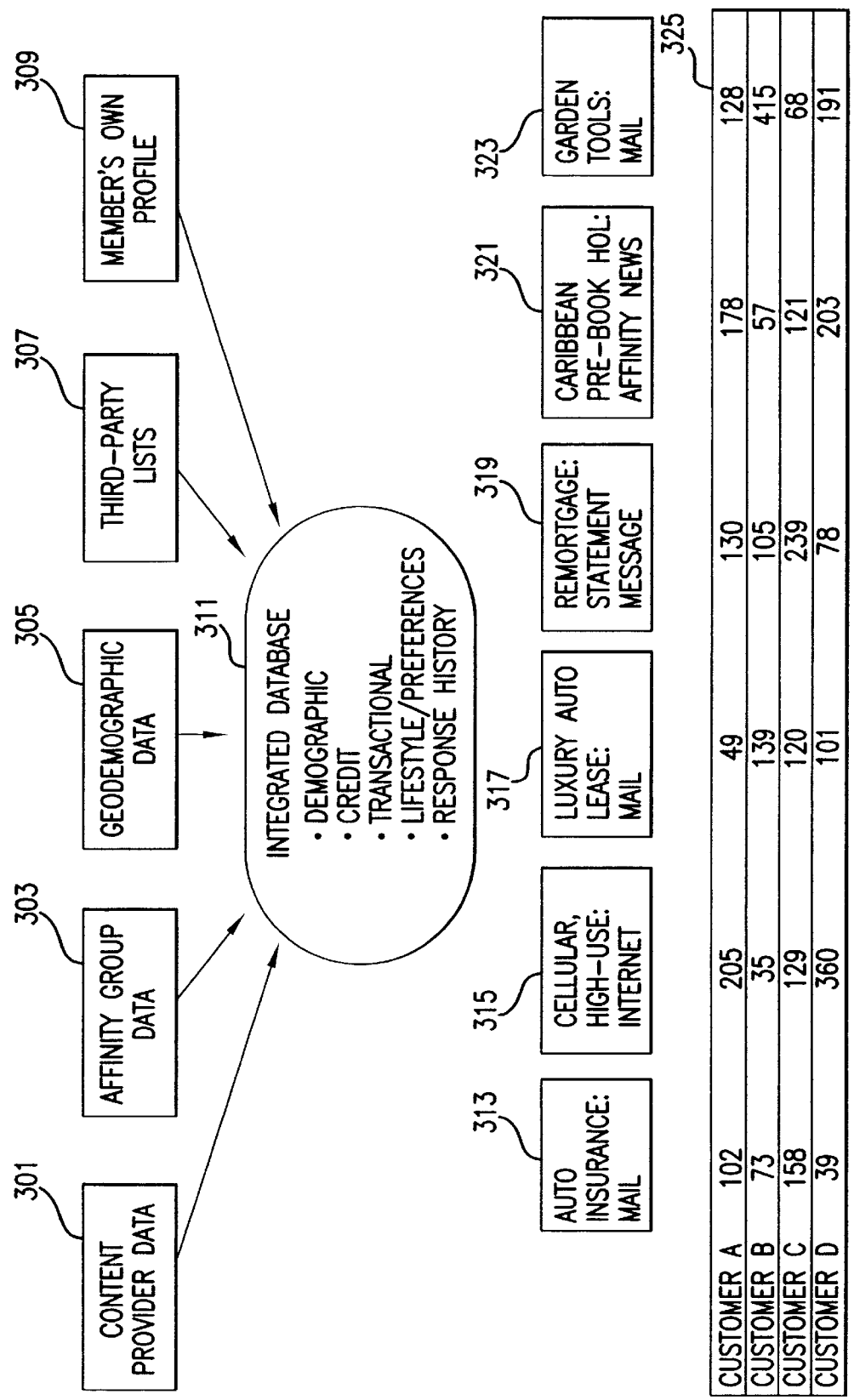
FIG. 3. Consumer Scoring

Referring to FIG. 3, the interaction of database and consumer information to arrive at a market score is described. It is a specific objective to be able to establish a consumer rating which amounts to a probability number that will indicate how likely it is that a consumer will respond to a particular offer presented to the consumer by a particular channel of commerce. This consumer scoring of offers by channel of communication results in information on how to most effectively present offers of goods and services to a consumer.

The various content providers 301 (previously noted in FIGS. 1 and 2) provide information on past performance of consumers to the integrated database 311. Affinity group data such as membership information in particular groups is also provided to the integrated database. Geo-demographic data, that is information on whether the consumer fits in a particular demographic group keyed to the geographic area in which the consumer is located, is also provided to the integrated database together with various lists from third parties and any profile of socioeconomic data presented by the member itself 309.

Thus the integrated database 311 comprises demographic, credit, transactional, lifestyle preferences, and response-to-offers history of a wide variety of consumers.

Based on this information the consumer is given a score, samples of which are shown in FIG. 3. Referring again to FIG. 3 for example, consumer C has a high score associated with responding to insurance offers by mail. In contrast consumer D has a very low score associated with responding to insurance offers by mail. Thus, in a single offer mailing, the present invention would cause an offer of automobile insurance to be made to consumer C but not to consumer A, B, and D.

Similarly a consumer in question might be a high user of cellular services and have an Internet address. In this instance consumer D would receive the highest score associated with providing an offer concerning cellular use over the Internet. In contrast, customer B may have an Internet address but not be a high use cellular user. Thus that consumer would have a much lower score.

In the area of luxury auto leasing and providing such offers by mail, consumer B might possibly have a high income and good credit would be more likely to respond to mail concerning luxury auto leasing whereas consumer A who might have a lower income and poor credit history would receive a much lower score. This can be seen from other examples. The offer of goods or services and the channel by which that offer is made produces a potential success score which can then be used by the system to arrive at the best offer and channel of communication by which that offer should be made to a particular consumer.

Figure 4:
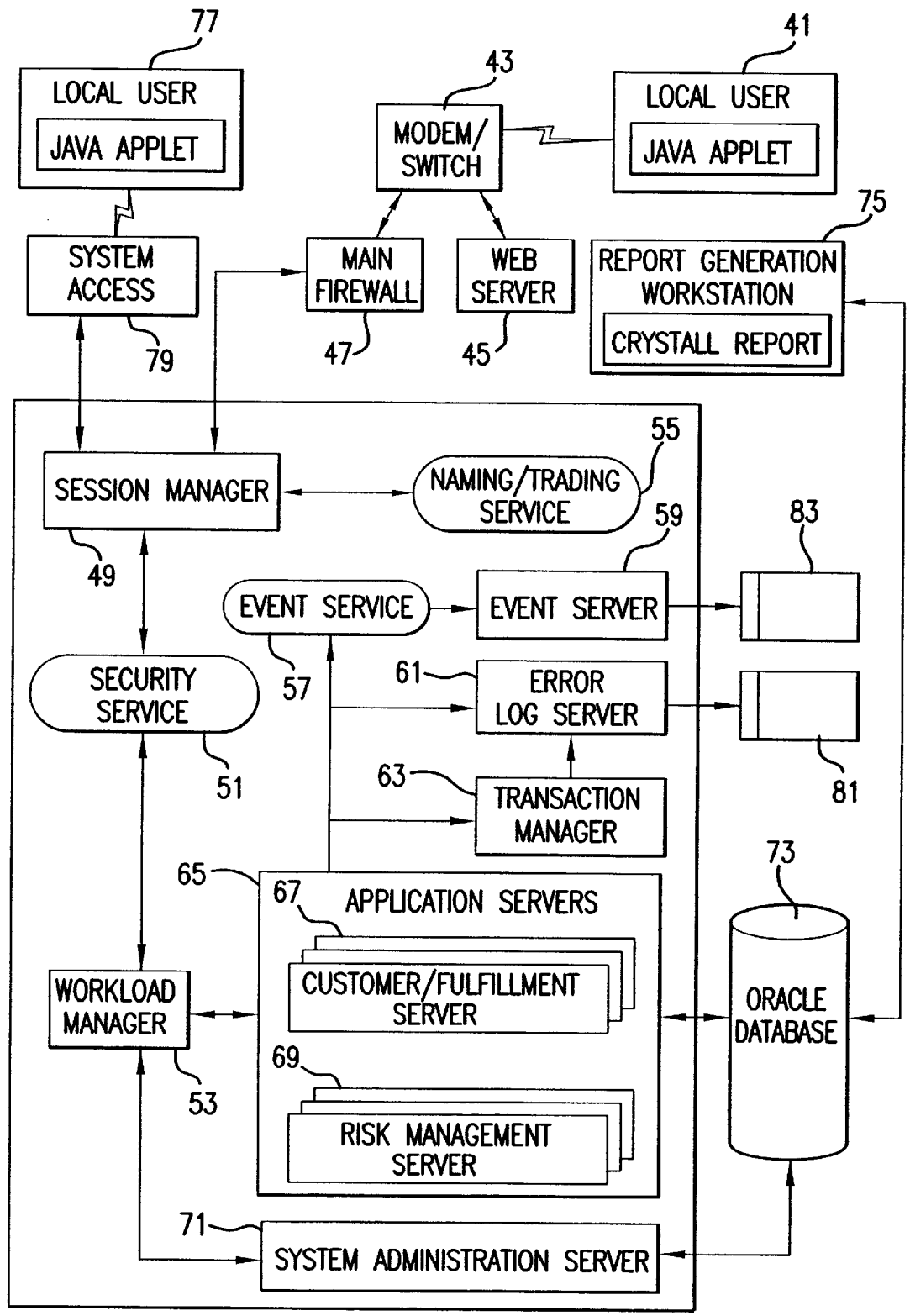
FIG. 4. System Dataflow Diagram

Referring to FIG. 4 the system data flow diagram is described. A remote user of this system 41 can access the present invention through a switch 43. A remote user dials the system and provides password and/or pass phrase information to a web server 45. The web server 45 serves to qualify a remote user to have access to the system. The web server is the first line of security defense for the system.

The remote user system can be a simple as an IBM PC compatible running a Pentium type processor with 16 megabytes or greater amount of RAM. The web server 45 which acts as a form of gate keeper for the system is a IBM PC or compatible with at least a Pentium processor and with 16 megabytes of RAM.

Upon successful qualification of the remote user, that is, a recognition that the remote user is allowed to access the system the web server then permits the remote user 41 to access the main segment firewall 47. All computers of the main segment are located behind the main segment fire wall 47. This firewall only permits system related traffic and also allows java applets, that is application programs, to be downloaded to the remote user, also known as client workstations. The main segment firewall 47 is one of the three security components of this system. It prevents access to the system unless a client workstation is using a java applet for system access.

Once access to the system is permitted for client workstation through the main segment firewall 47, the session manager 49 of the present system is invoked. The session manager receives the password/pass phrase and user ID from the remote user to verify that the remote user is allowed to access the system. If verification is successful, the system manager creates a "child session object" which keeps the security authorization for the user active during the time when the remote user is accessing the system. If the user desires to access another portion of the system, the child session object is accessed to verify authorization by an exchange of security tickets from the pre-approved child session and the object of the system to be accessed.

This system also comprises a security service 51. As previously noted the web server is the first line of defense against outside users. If the user is not authorized, the web server will not permit further communication. If the user is registered, the main segment firewall 47 can be accessed and an applets may be downloaded. Without the applets, the user cannot gain access to the system. The main segment firewall 47 only permits communication that is a result of using the appropriate applets. Other communication is filtered and not permitted in the system.

The security service (the third security component) interacts with the session manager to assign security tickets associated with a users access of the system. The security tickets are carried along with the session and exchanged with other objects within the system so that the user does not have to continually reenter password and pass phrase and user ID information. In addition, no other objects of the system can be accessed unless a proper security ticket is attached to the user session.

The system also comprises a workload manager 53. The workload manager constantly views all servers of the system to insure that there is not a data backup at any one of the servers. A server creates a child object after a request is made. In this manner no customer request has a waiting time longer than would be achieved at other servers. In short, the workload managers checks the workload on each server and passes a request from a user to the least busy server.

The system also comprises a series of application servers 65. The application servers segment may comprise customer/fulfillment server 67 and a series of risk management servers 69. As a general rule the application servers access information from the database 73 through a series of pre-defined stored procedures. (ie. not a dynamically created SQL queries). This also minimizes the ability of an outsider to gain access to information for which the outsider is not permitted. Thus the approach enhances security and data integrity since only fixed queries may be made to the database and, in general, data in the database may not be changed by an outside user.

The customer/fulfillment server 67 permits an outside user to access the users data base record to check status of orders, credit issues and other matters relating to the customer. The system may comprise numerous customer servers since the expected workload from numerous customers will lead to a requirement for brief wait times for response to queries.

Among the application servers 65 are also a series of risk management servers 69. The risk management server 69 interact with the database 73 concerning individual customers and the propensity of that customer to accept an offer that is made. For example the risk management server may determine that consumer number one has a low financial risk. Therefore offers of greater value will be presented to the customer via the customer fulfillment server 67. Adversely, if the risk management server determines that a particular consumer has a higher level of financial risk, then the system will only permit less risky and lower value offers to be made to the consumer via the customer/fulfillment server 67.

The system also comprises a system administration server 71 which has higher level access privileges for the database to allow database administration and monitoring of overall workload managed by the workload manager 53. The system administrator also serves the additional functions of maintaining system user accounts, configuring the system parameters, and starting any batch processing. The application server 65 also provide a variety of information to a system event service 57. The event service comprises an error log server 61 which logs and reports program and system errors. All functions of the service and any errors associated therewith are logged in the event server.

The transaction manager 63 keeps a running account of all transactions on the system and categorizes those transactions. The transaction manager keeps track of any open transactions and clean up the data in the system in the event of a rollback. Information from the transaction manager is also provided to the error log server 61 so that the number of errors compared to the number of transactions can be appropriately reported 81. In addition, the error log server also comprises communications ability to automatically notify maintenance personnel of any serious problems.

The event server 59 serves to log application level events such as login and logout and other functions.

The system also comprises a naming/trading service. Named objects are created and registered with the naming/trading service during system startup. They represent top level servers and their role is similar to those of a database servers. Named objects can open one or more connections to the database and receiving process requests for service from other objects between these connections. Information on the name services are provided to the session manager 49 so that request for service can be appropriately routed.

Figure 4A:
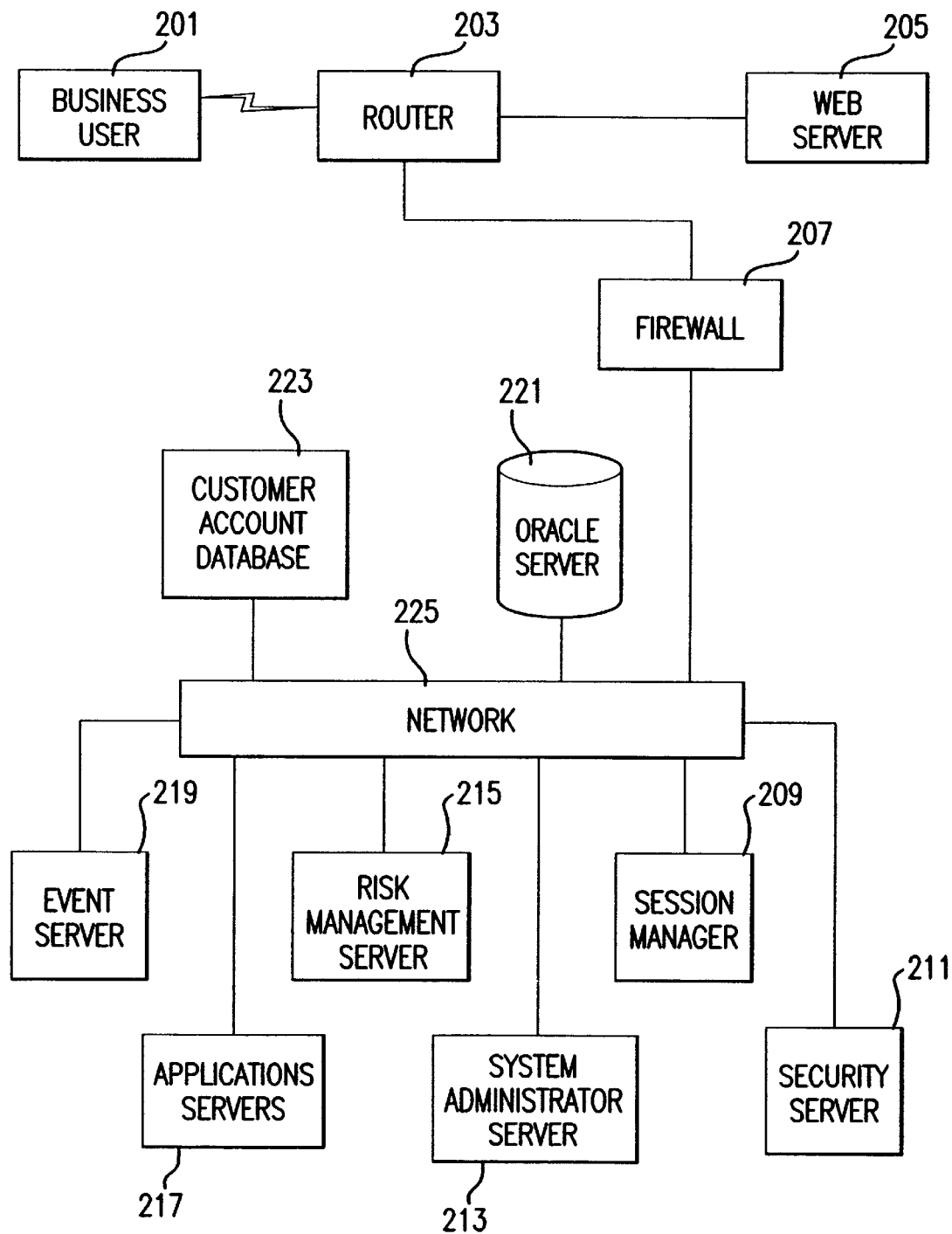
FIG. 4A. System Hardware Summary

In summary, and referring to FIG. 4A hardware for the system comprises users 201 communicating with a system router 203 and having initial interaction with the web server 205 to qualify the user access the system. Assuming an access is permitted, the user 201 interacts with the segment firewall 207 to gain access to the system. The session manager 209 then permits access to various services of the system including the customer account stored in a database 223 managed by a database server 221. Security functions are managed by a security server 211. System administration and functioning is monitored and controlled by a system administrator server 213. Applications server 217 allows the customer to access the customer's account and to place and monitor orders while risks associated with consumer orders are managed by the risk management server 215. Overall system health and reporting of errors and functioning is accomplished by the event server 219.

Figure 5:
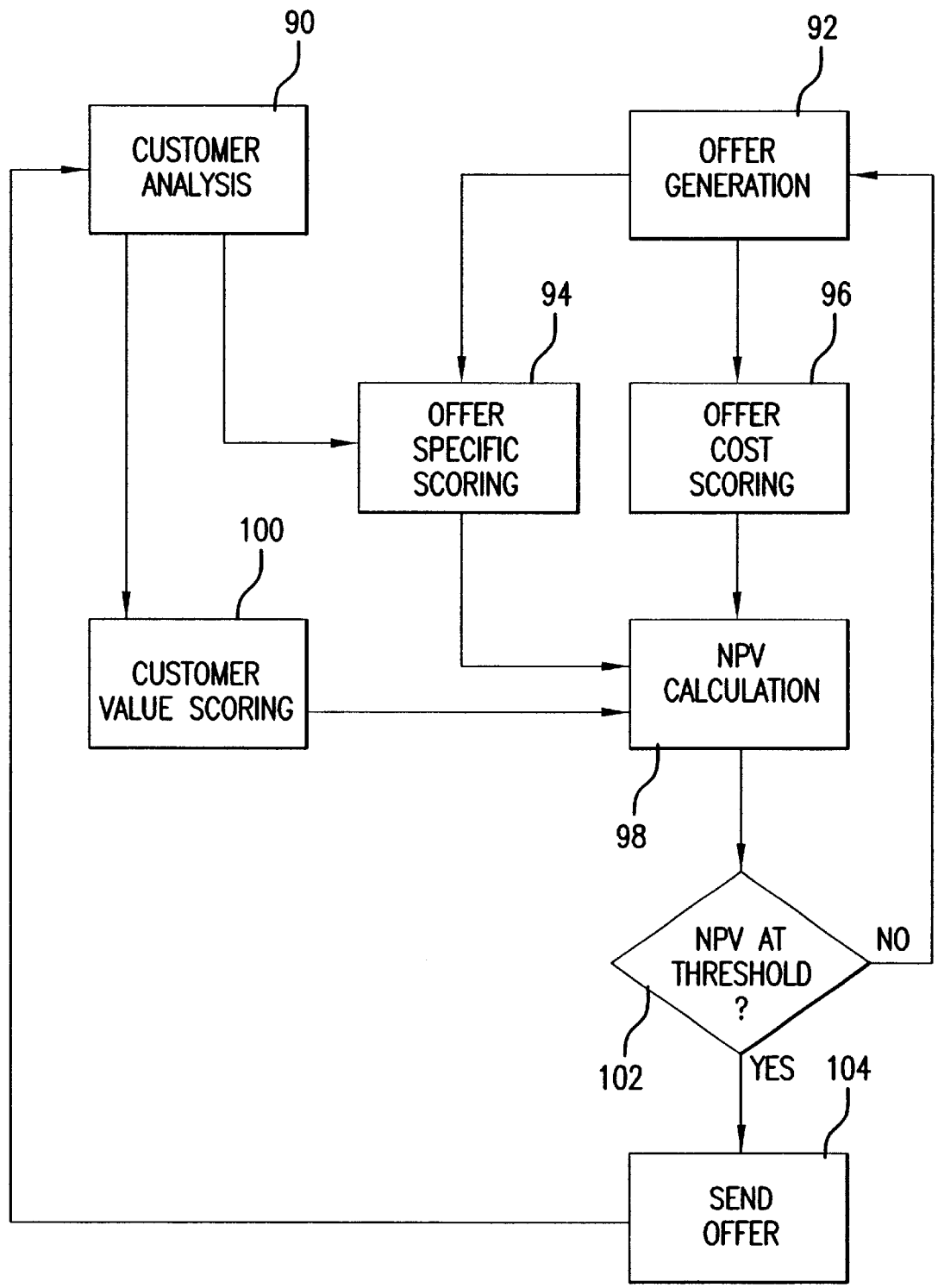
FIG. 5. Overview of the Offer creation/Communication process

As noted previously a key aspect of the present invention is to optimize the response to merchandise offers by offering the customer the best value for merchandise in which the customer is interested. This concept is not just market "puffing." A key aspect of the present invention is to calculate what would represent the best value to the customer. In the present invention this calculation is known as the "net present value" calculation, or "NPV." The NPV is arrived at by analyzing the customers to whom offers are to be made and the offer itself. Referring to FIG. 5 the offer analysis and optimization procedure is shown generally. The present invention performs numerous customer analysis tasks as will be explained in more detail. Generally the statistics on customers in terms of their spending habits and other financial economic factors is evaluated to rate a particular customer. In addition the offer to be presented to the customer is generated 92 and input to the customers analytical process to arrive at an offer specific score 94. That offers specific score is then presented to the NPV calculation engine 98.

The offer generated 92 which relies upon product and market information, is also evaluated based upon the channel of communication in which the offer to the customer will be made. Thus an offer/channel specific scoring 96 is also calculated. The offer/channel specific score is also provided to the NPV calculation engine 98.

Finally a customer valuation score 100 is generally created which is independent of the offer being presented and simply relates to the economic responsibility and other commercial factors associated with the customers purchasing behavior. This customer value score 100 is also presented to the NPV engine 98. A net present value is then calculated for the entire offer based on the customer to whom the offer is to be made. Since, as noted earlier, it is the objective of the present invention to provide the highest value of offers to the customer and to also maximize the customer response to those offers, it is desired to have NPV thresholds set at a significantly high level such that customers will respond to the offers. Thus, after creation of the NPV for the offer in question 98 the present invention next determines if the NPV is at a threshold high enough 102 to be offered to the customer. If the NPV threshold is exceeded, the offer is sent to the customer 104 and statistics/characteristics of the offer are provided back to the customer analysis engine 90 to be monitored for customer response. If the NPV threshold is not reached, a new offer is generated 92 and the NPV scoring is then repeated. In this fashion, only the highest value offers based on the merchandise/services being offered and the potential customer response to such offers is sent to the other communication channeled to the customer.

Figure 6:
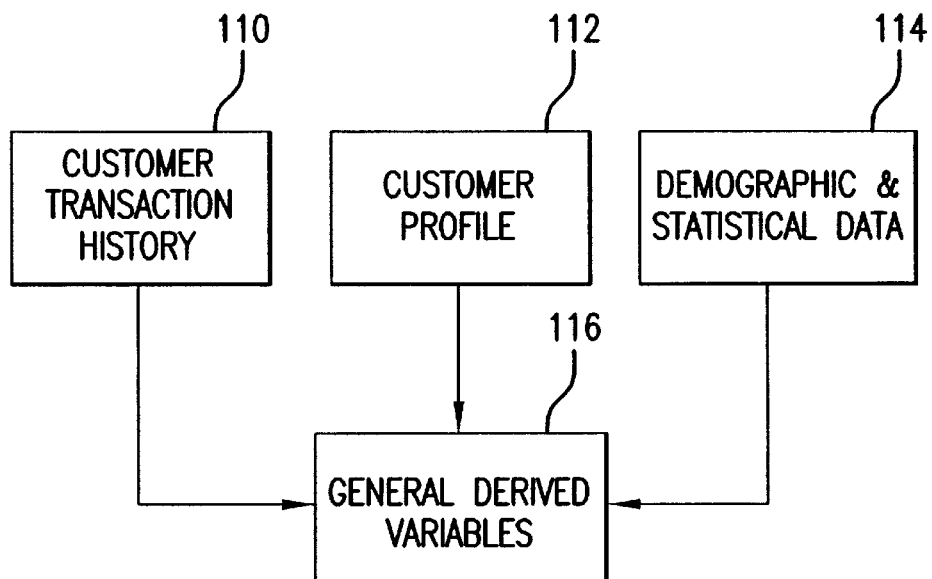
FIG. 6. Calculation of the General Derived Variables

Referring to FIG. 6 the generalized customer analysis is described. The data base of the present invention stores information concerning the customers transaction history. This database includes all of the highly disparate goods and services purchased with the customer's financial card or through the loyalty marketing network and the other data that can be collected on the customer's purchases. In addition, the individual customer profile is also accessed. This customer profile 112 comprises financial information on the customer, the customer's credit history, financial status, debts and any other information concerning that customer. This customer profile 112 is also used in individualized customer analysis. In addition, the demographic and statistical data 114 concerning the demographic group to which the customer belongs is also used in the calculation. This demographic/statistical data 114 describes the spending habits of the generalized demographic group to which the customer belongs. This is also an index of the potential purchases that a particular customer might make based on the customers demographic group, even though the customer may not have made such a purchase recently, or at all. These three factors, the customer transaction history 110, the customer profile 112, and the customer's demographic/statistical data 114 are input to the present invention to obtain a generalized series of derived variables concerning the customer 116. This variable takes into account the amount and frequency of purchases, what has been purchased specifically, and how often.

This overall customer analysis and database is dynamic in nature. By using neural net analysis, the content and structure of the database is constantly updated as more recent customer transactions and histories are received. Notwithstanding this dynamic quality of the customer related databases, which yields a dynamic understanding of influential customer attributes, the customer database will maintain actively the full historical structure of its data structures so that analysis of the data structure evolution itself may be performed. Finally, in linking derived insights to ongoing data structure evolution, the customer database will support dynamic customer-specific product inventory management, such that influential customer attributes are identified and accommodated in the database, and the relevant product inventory for that specific customer may be maintained.

Figure 7:
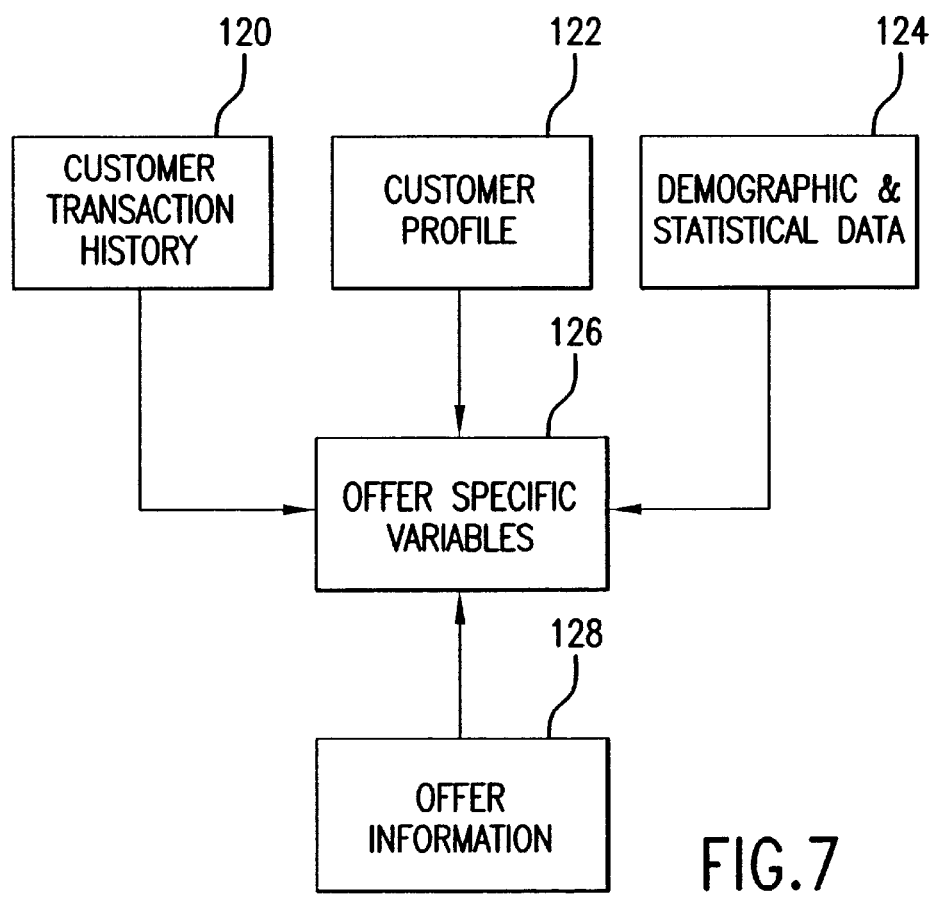
FIG. 7. Calculation of Offer-Specific Variables

Referring to FIG. 7 a customer analysis relative to a specific offer is described. Again, customer transaction information 120 relating to a particular customers specific purchases of goods and services is used together with the specific customer profile 122 which describes the economic and credit history of the particular customer in question. These are used together with demographic data concerning the demographic group to which the customer belongs 124 in subsequent calculations. However, in this instance information concerning the offer 128 is provided to the mathematical model to arrive at a series of offer specific variables which relate to the likelihood of the consumer purchasing the specific offer in questions.

Figure 8:
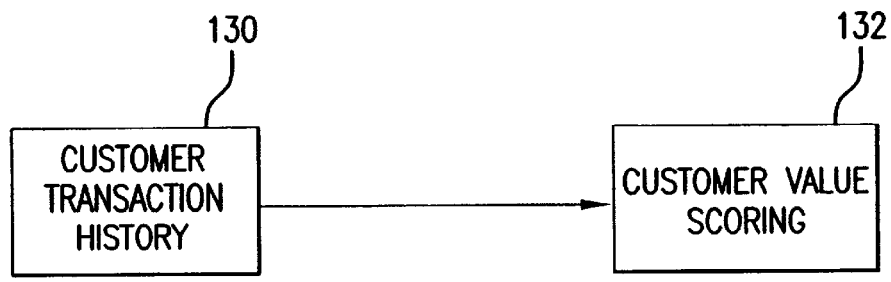
FIG. 8. Customer Value Scoring

Referring to FIG. 8 the customer value scoring is described. This scoring relates very specifically to the customer transaction history 130. The customer transaction history takes into account the specific purchase of goods and services of the particular customer. Based upon the amount, frequency of purchase, and other factors such as customer profile (e.g. customer demographic data, wealth, risk, interest, and other indicators a customer value scoring 132 is calculated.

Figure 9:
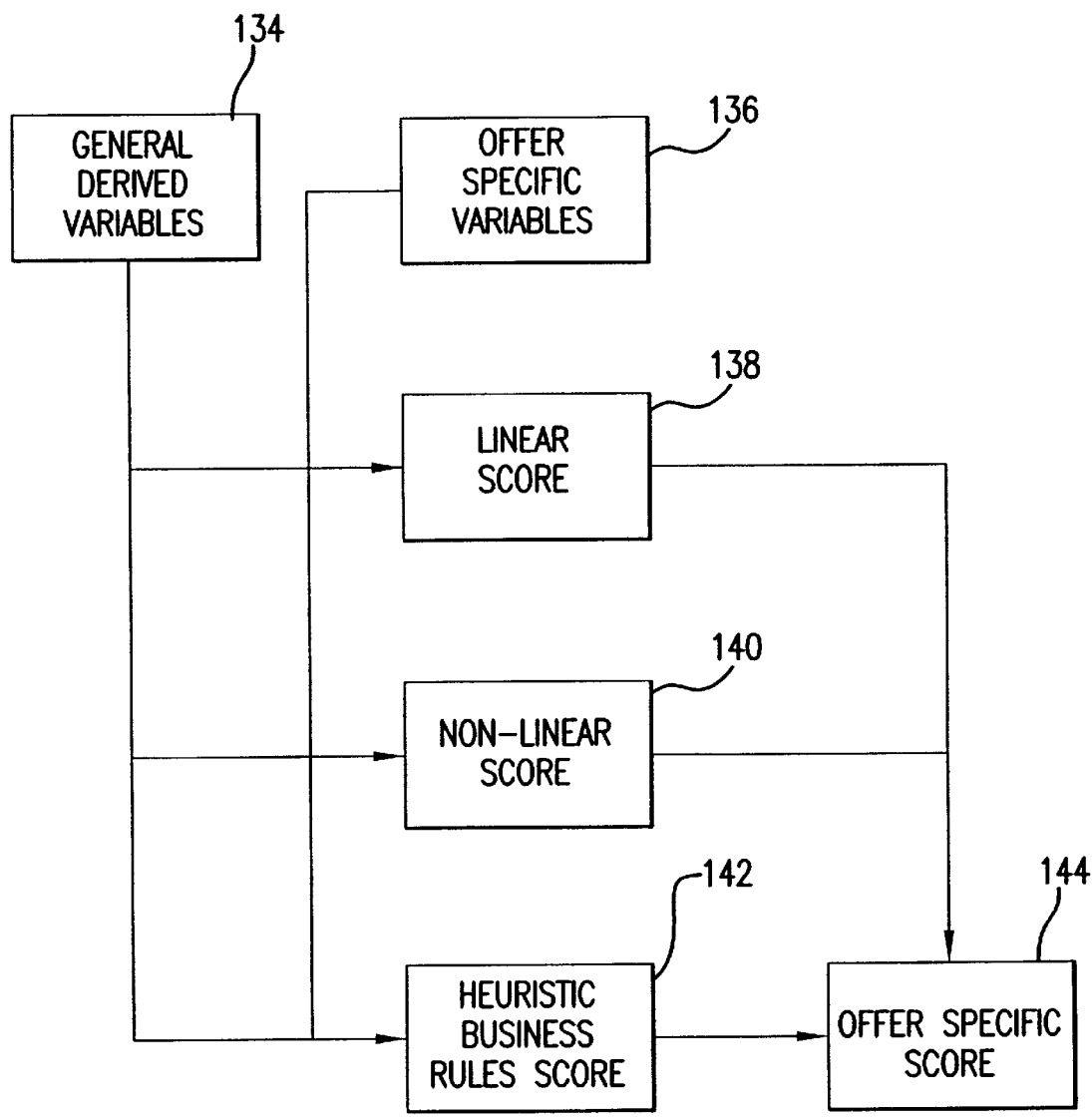
FIG. 9. Offer-Specific Scoring

Referring to FIG. 9 offer-specific scoring relative to a particular customer is described. As noted previously general derived variables 134 are calculated based on customer and demographic group specifics. In addition offer specific variables 136 are calculated based upon customer characteristics and demographic information and the offer in question is also calculated. These two sets of derived variables are input to the system to create a linear score 138 which relates simply to an weighted sum of the variable in question.

A non-linear score 140 is also calculated and results from the output of the neural network. For example a specific customer who makes many different and varied transactions and spends a great deal of money may have a higher non-linear score than does a customer of high income but lower velocity buying habits.

Finally the general derived variable and the offer specific variable are provided to heuristic business rules 142 relating to consumer purchasing. For example an individual consumer who has just spent $50,000 on an automobile might not immediately spend another $10,000 on another item but might wait generally a period of time before purchasing large ticket items again. The linear score 138, the non-linear years score 140, and the heuristic business rules score 142 are then combined to create an offer specific score 144 for the consumer in question.

Figure 10:
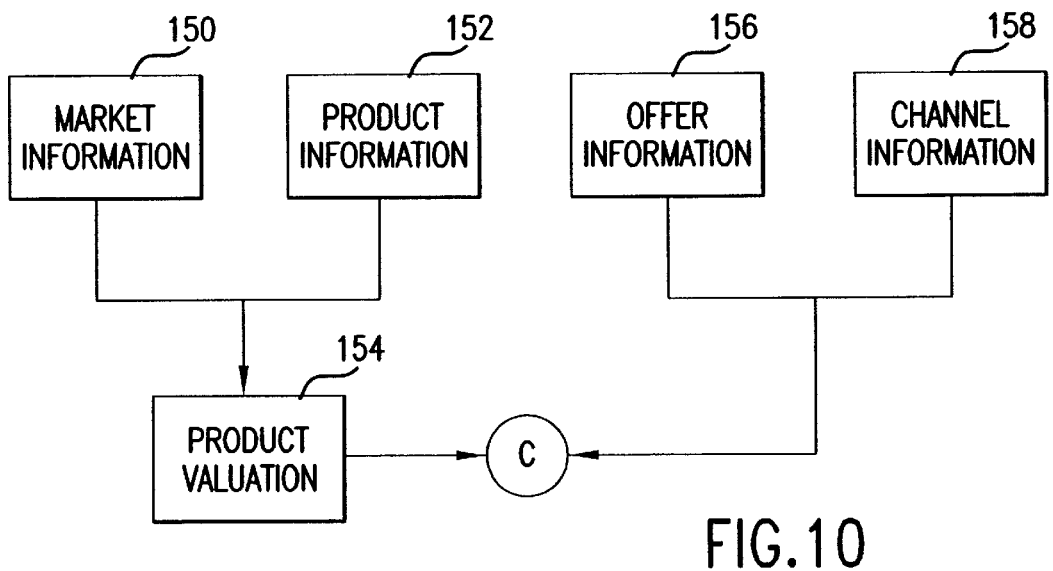
FIG. 10. Product/Channel Valuation

Referring to FIG. 10, the offer/channel of communication as input to the NPV score is shown. Market information 150 which comprises market demand for various goods and services is combined with product information 152 which is information specific to a given product. These two factors are combined to create a product valuation 154 which relates to the market demand for the product being offered. For example, lava lamps may be offered by a particular merchant. However, the demand for lava lamps peaked in the 1960's. Thus the market information combined with the product information may give rise to a fairly low product valuation. In contrast a product being offered which is very much in demand in the present day will have a higher product valuation.

In addition, information on the offer to be made 156 which may be as simple as a single item being offered or a combination of items being offered, is combined with information on the channel over which the information will be offered to the consumer 158. These three factors, product valuation 154, the offer information 156, and the channel information 158 are combined to determine the cost of presenting the offer to the customer.

Figure 11:
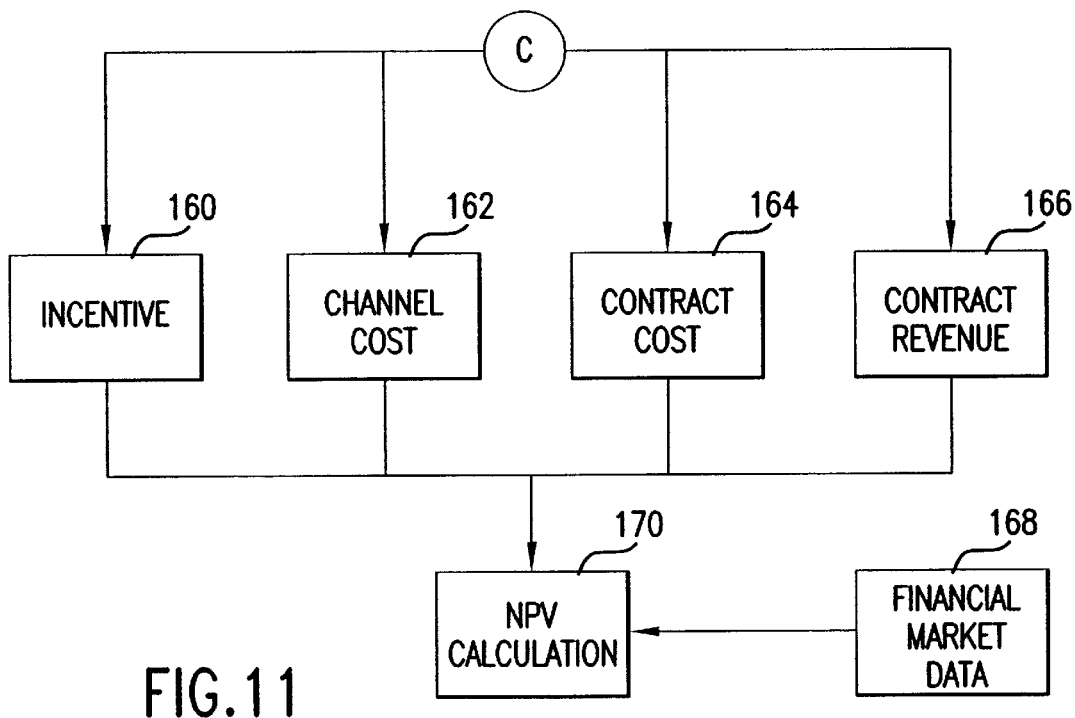
FIG. 11. Channel Cost Valuation

Referring to FIG. 11 the cost of the offer is shown. As noted previously the product valuation, offer information, and channel information is combined and a calculation is made concerning the incentive 160 to the consumer to make the purchase in question. For example an incentive in the form of a discount of a fixed percent may be offered. While this may be attractive to the consumer, it clearly reduces the amount of money that the consumer will spend on the offer in question. Channel cost 162 is also evaluated. For example providing the offer over the Internet to a customer's e-mail may be inexpensive when there are numerous customers receiving the same offer. In contrast, providing an insert to a customer's mailing may be more expensive.

In addition to incentive costs and channel costs the contract cost 164 is also taken into account. The contract cost may be minimal or none if the merchant is simply offering the goods and services. However, if the organization sponsoring the present invention must purchase goods and services at a reduced cost, there is cost associated in the administration of the offer for the purchase of goods or services in question. However, contract revenue 166 is also taken into account since the difference between the value of the offer and the contract cost may give rise to revenue at a certain level to the sponsoring organization. Thus these four factors plus external market and econometric information go into a calculation concerning the cost of the offer.

Finally financial market data 168 is taken into account in calculating the cost of the offer. Such financial information as cost of money, interest rate trends and other factors may be a cost of making an offer which must be taken into account. For example the manager of the present invention might be paid in one year if the customer keeps an offered mortgage for one year. In this case the system would need to know the one year interest rate to calculate the NPV. All of these pieces of information relating to incentive, channel costs, contract costs, contract revenue, and financial market data are all presented to the NPV calculation engine.

Figure 12:
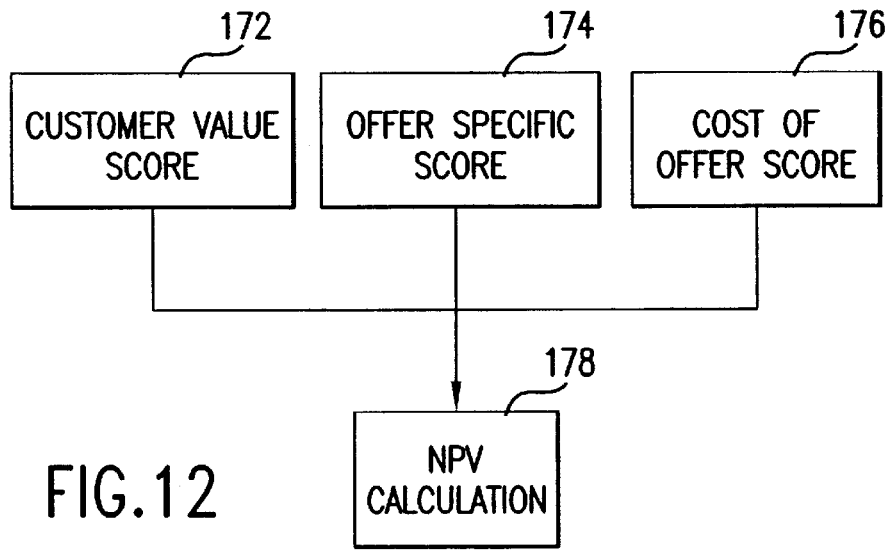
FIG. 12. NPV Calculation Summary

Referring to FIG. 12 the NPV calculation summary is shown. A customer value score 172 which strictly relates to the customer's purchasing habits, is combined together with an offer specific score 174 which takes into account customer spending, customer financial, and demographic group data are combined together with information relating to the costs of making the offer 176 to the consumer. These three series of factors and variables are presented to the NPV calculation engine 178 to arrive at an NPV score.

Figure 13:
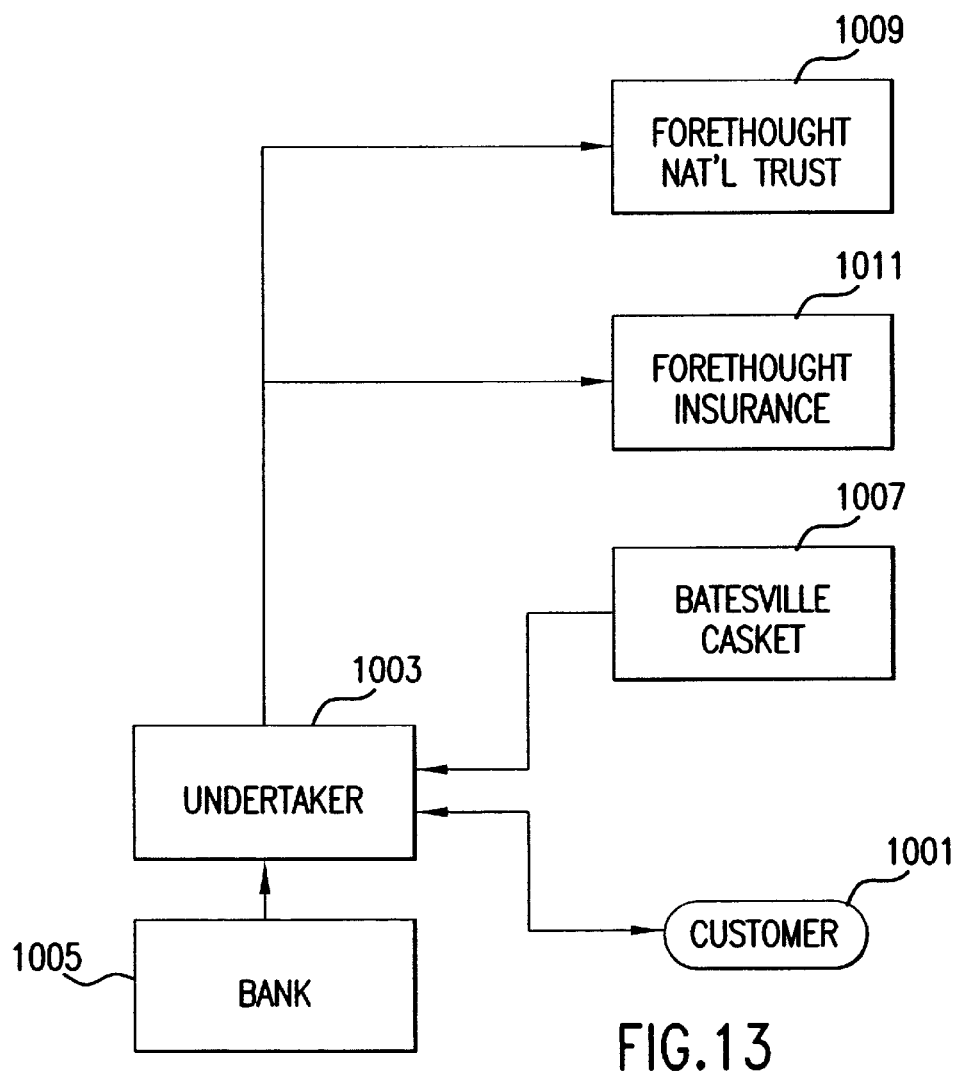
FIG. 13. Example without the Present Invention

Referring to FIG. 13, an example of the present invention serving a particular need is shown. While pre-need burial service purchase is a topic not often addressed, it is one that the current baby-boomer generation more and more is requesting as they plan for the years ahead and attempt to lessen the burdens on loved ones. A typical situation is shown in FIG. 10 where consumers 1001 desire to purchase pre-need burial services from undertaker 1003. This results in casket price guarantees that undertaker 1003 can obtain from casket maker 1007.

The consumer 1007 purchases a trust contract from a national trust bank (or he purchases a pre-need burial insurance contract from a life insurance company) 1011 or invests the money through a bank 1009 to insure that at the time of the death of the consumer, the casket and burial services can be paid for.

Figure 14:
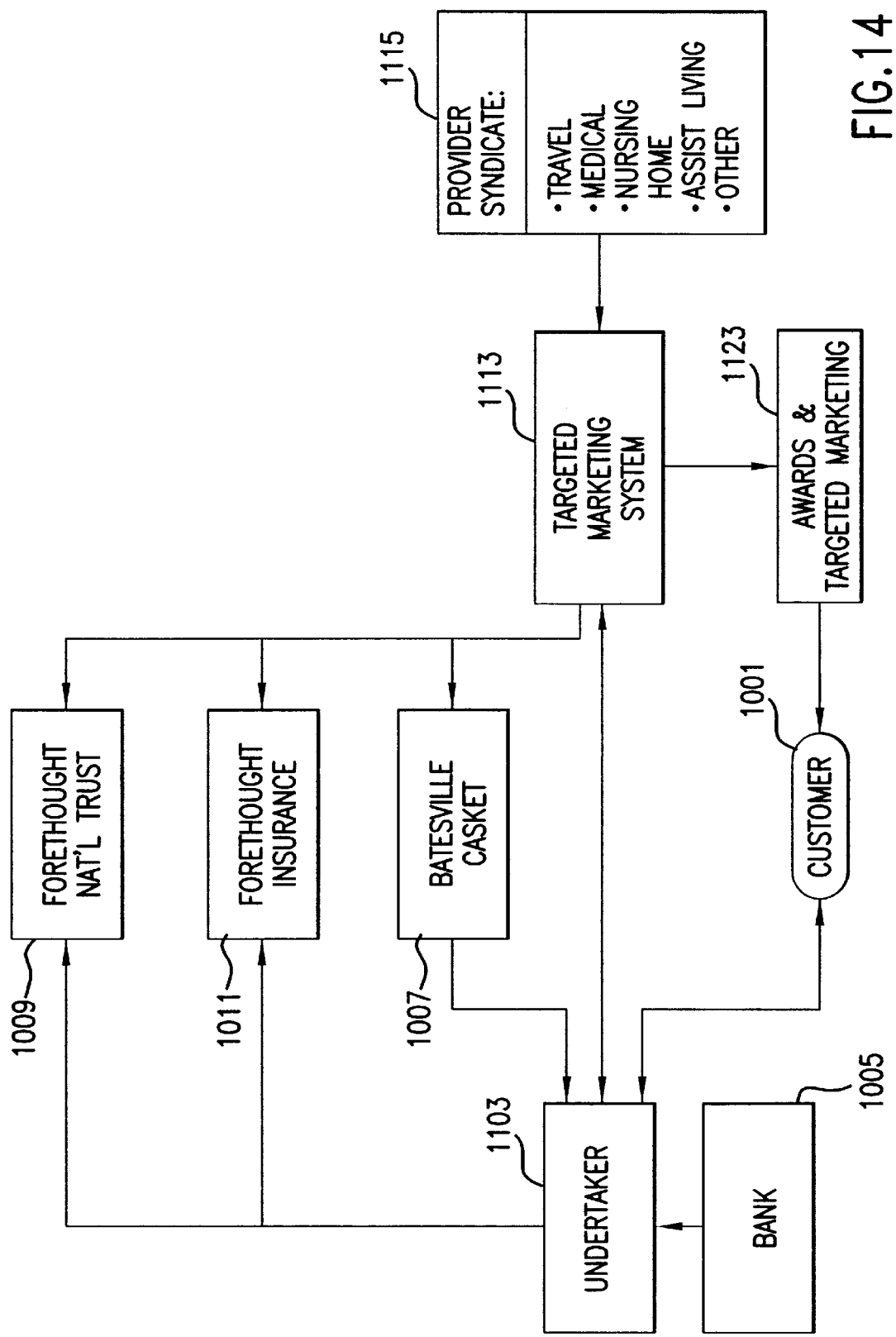
FIG. 14. Example with the Present Invention.

Referring to FIG. 14 the pre-need burial service model utilizing the present invention is shown. In this case, the present invention 1113 both receives leads from and provides leads to the undertaker 1103 relating to those who have an interest in pre-need burial services and potentially other services and goods that have a relation to the aging of the customer. For example, someone who is considering pre-need burial service purchase demographically is probably older and is contemplating not only his/her eventual demise but also other issues relating to aging. Upon notification to the present invention database of that consumer's interest, the present invention searches its inventory of products and services and creates offers to that consumer based upon the expressed interests of the consumer and the consumers credit and spending profiles. In this case, when the consumers credit card statement is delivered or the consumer signs onto the Internet (if the consumer has preauthorized the system) the consumer would be presented with travel, nursing home, assisted living and other related literature and discounted offers provided by content providers 1115. In addition the present invention provides award currency 1123 to consumers by virtue of the purchase of the pre-need burial service. Thus the consumer receives targeted mailings with offers for which the award currency may be used.

In a similar fashion, a consumer that purchases nursing home services might cause the system to alert the undertaker to provide a discount offering to that person. It is a fundamental aspect of the present invention that any such offer would only be made to the consumer through existing channels of communication with the consumer such as bank statements, Internet, other invoices and the like. It is not the intention that the present invention in any way result in cold calls or "junk mail" being sent to the consumer.

A system and method for targeted marketing to consumers based upon individual consumer characteristics, the customized offer presented and the means of delivery/communicating the offer has been described. It will be recognized by those skilled in the art that other methods and equivalents of practicing the present invention are possible without departing from the spirit of the invention as described.

We claim:

1. A computer-implemented method for targeted marketing of goods and services to specific customers, said computer-implemented method comprising the steps of:

creating an electronic customer database;

creating an offer of goods and services to be made to a specific customer in the customer database;

analyzing the offer to be made to a customer in terms of the likelihood of the customer to accept the offer;

calculating, using the computer a value of the offer to be made to the customer as an offer value by calculating a net present value of the offer for measuring a future executed transaction value in advance of the offer being release, wherein the calculation of the net present value comprises combining a customer value, an offers-specific value, and a cost-of-offer value; and presenting a offer to the customer when the offer value resulting from the net present value calculation is at or above a specific offer value threshold;

whereby a likelihood that the customer responds positively to the offer is increased.

2. The method for targeted marketing of goods and services to specific customers of claim 1 wherein creating a customer database further comprises creating a database of a plurality of customer transaction histories.

3. The method for targeted marketing of goods and services to specific customers of claim 2 wherein creating a customer database further comprises creating a database of a plurality of customer profiles.

4. The method for targeted marketing of goods and services to specific customers of claim 3 wherein creating a customer database further comprises creating a database of demographic and statistical data for a plurality of customer groups.

5. The method for targeted marketing of goods and services to specific customers of claim 4 wherein the demographic database comprises general information about the demographic group to which the specific customer belongs.

6. The method for targeted marketing of goods and services to specific customers of claim 3 wherein the customer profiles comprise at least financial, economic, and behavioral information about specific customers.

7. The method for targeted marketing of goods and services to specific customers of claim 6 wherein the financial and economic information about specific customers comprises annual income, credit rating, amount of debt, amount of credit available, prior transaction behavior, family status and household behavioral economic indicators.

8. The method for targeted marketing of goods and services to specific customers of claim 2 wherein the customer transaction histories comprise information concerning a spending habits of specific customers.

9. The method for targeted marketing of goods and services to specific customers of claim 8 wherein the spending habits of specific customers comprises information about a frequency of purchases, a dollar amount of individual purchases, and the types of goods and services purchased for specific customers.

10. The method for targeted marketing of goods and services to specific customers of claim 1 wherein analyzing the offer to be made to customers further comprises creating a product valuation relating to a market demand factor for goods and services being offered.

11. The method for targeted marketing of goods and services to specific customers of claim 1 wherein analyzing the offer to be made to customers further comprises evaluating a channel over which the offer is to be made.

12. The method for targeted marketing of goods and services to specific customers of claim 1 wherein analyzing the offer to be made to customers further comprises evaluating a cost of the goods and services offered an incentive offered to the customer to purchase the goods and services offered, and a revenue generated from a purchase by the customer of the and services offered.

13. The method for targeted marketing of goods and services to specific customers of claim 1 wherein creating a customer database comprises the step of creating a customer value score based upon information relating to purchasing habits of the customer.

14. The method for targeted marketing of goods and services to specific customers of claim 1 establishing the offer value threshold comprises establishing a net present value below which the offer is not made to the customer.

15. The method for targeted marketing of goods and services to specific customers of claim 1 wherein creating the customer database further comprises updating the customer database with information concerning the offer of goods and services that is made to the customer.

16. A system for targeted marketing of goods and services to specific consumers comprising:

goods and services offered by content providers;

channels of communications over which offers are made;

offer generation means connected to the channels of communications for providing offers of goods and services to the customer;

a customer database connected to the offer generation means; and offer value calculation means connected to the customer database and offer generation means for calculating the value of the offer to the customer;

wherein the offer value calculation means comprises logic that combines a cost-of-offer score with an offer specific score and a customer value score to arrive at a net present value of the offer for measuring a future executed transaction value in advance being made; and wherein the offer to the customer is made only when a resulting net present value is at or above a specific offer value threshold.

17. The system for targeted marketing of goods and services to specific consumers of claim 16, wherein the customer database comprises:

a plurality of data structures forming:
  a customer transaction history database;
  a customer profile database; and
  a demographic and statistical data database; and means to revise data structures stored in the customer database to reflect customer purchasing experiences.

18. The system for targeted marketing of goods and services to specific consumers of claim 16 wherein the channels of communication are taken from the group consisting of invoice mailings, statement mailings, the Internet, electronic mail, and telephones.

19. The system for targeted marketing of goods and services to specific consumers of claim 16 wherein the cost of offer score comprises:

a cost of the channel of communication over which the offer is being made;

a cost of the contract for the offer;

an incentive to the customer to purchase the offer; and expected contract revenue resulting from the customer purchasing the offer being made.

* * * * *